(12) United States Patent
Fontenot

(10) Patent No.: US 9,688,901 B2
(45) Date of Patent: Jun. 27, 2017

(54) LOST CIRCULATION DRILLING FLUIDS COMPRISING ELASTOMERIC RUBBER PARTICLES AND A METHOD FOR DECREASING WHOLE MUD LOSS USING SUCH COMPOSITION

(71) Applicant: James Blair Fontenot, Eunice, LA (US)

(72) Inventor: James Blair Fontenot, Eunice, LA (US)

( * ) Notice: Subject to any disclaimer, the term of this patent is extended or adjusted under 35 U.S.C. 154(b) by 285 days.

(21) Appl. No.: 13/936,083

(22) Filed: Jul. 5, 2013

(65) Prior Publication Data
US 2015/0008044 A1    Jan. 8, 2015

(51) Int. Cl.
*C09K 8/32* (2006.01)
*C09K 8/03* (2006.01)
*E21B 21/00* (2006.01)
*C09K 8/035* (2006.01)
*C09K 8/22* (2006.01)
*C09K 8/502* (2006.01)
*C09K 8/516* (2006.01)

(52) U.S. Cl.
CPC ............... *C09K 8/32* (2013.01); *C09K 8/035* (2013.01); *C09K 8/22* (2013.01); *C09K 8/502* (2013.01); *C09K 8/516* (2013.01); *E21B 21/003* (2013.01); *Y10T 428/298* (2015.01)

(58) Field of Classification Search
CPC .............................. C09K 8/32; E21B 21/003
See application file for complete search history.

(56) References Cited

U.S. PATENT DOCUMENTS

| | | | | |
|---|---|---|---|---|
| 2,801,967 A * | 8/1957 | Wilson | C09K 8/32 | 507/103 |
| 2,805,990 A * | 9/1957 | Bergman | E21B 21/003 | 507/103 |
| 4,498,995 A * | 2/1985 | Gockel | C09K 8/032 | 166/292 |
| 4,510,998 A * | 4/1985 | Peiffer | C09K 8/50 | 166/294 |
| 4,633,950 A * | 1/1987 | Delhommer | C09K 8/035 | 166/294 |
| 4,704,213 A * | 11/1987 | Delhommer | C09K 8/32 | 175/72 |
| 5,071,575 A * | 12/1991 | House | C09K 8/035 | 175/72 |
| 5,076,944 A * | 12/1991 | Cowan | C09K 8/035 | 175/72 |
| 5,806,592 A * | 9/1998 | Forrest | C09K 8/035 | 166/267 |
| 5,826,669 A * | 10/1998 | Zaleski | C09K 8/14 | 166/292 |
| 5,861,362 A * | 1/1999 | Mayeux | C09K 8/035 | 175/72 |
| 6,017,854 A * | 1/2000 | Van Slyke | C09K 8/32 | 507/103 |
| 6,518,224 B2 * | 2/2003 | Wood | C09K 8/035 | 175/72 |
| 6,806,232 B1 * | 10/2004 | Cart | C09K 8/24 | 507/107 |
| 6,825,152 B2 * | 11/2004 | Green | C09K 8/02 | 175/72 |
| 6,889,780 B2 * | 5/2005 | Whitfill | C09K 8/05 | 166/292 |
| 6,902,002 B1 * | 6/2005 | Chatterji | C04B 28/02 | 106/696 |
| 7,066,285 B2 * | 6/2006 | Shaarpour | C09K 8/24 | 175/72 |
| 7,297,662 B2 * | 11/2007 | Verret | C09K 8/502 | 166/282 |
| 7,381,114 B2 * | 6/2008 | Poling, Sr. | B24B 5/366 | 451/5 |
| 7,405,182 B2 * | 7/2008 | Verrett | C09K 8/035 | 166/294 |
| 7,488,705 B2 * | 2/2009 | Reddy | C09K 8/5045 | 166/294 |
| 7,717,180 B2 * | 5/2010 | Badalamenti | C04B 28/02 | 166/279 |
| 7,866,393 B2 * | 1/2011 | Badalamenti | C04B 28/02 | 166/279 |
| 7,870,903 B2 * | 1/2011 | Fang | C09K 8/20 | 166/285 |
| 7,923,413 B2 * | 4/2011 | Ghassemzadeh | C09K 8/5045 | 166/292 |
| 8,043,997 B2 * | 10/2011 | Whitfill | C09K 8/03 | 166/278 |
| 8,231,428 B2 | 7/2012 | Poling | | |
| 8,404,622 B2 * | 3/2013 | Ghassemzadeh | C09K 8/5045 | 166/292 |
| 2002/0010100 A1 * | 1/2002 | Wood | C09K 8/035 | 507/100 |
| 2008/0017376 A1 * | 1/2008 | Badalamenti | C04B 28/02 | 166/292 |
| 2010/0298175 A1 * | 11/2010 | Ghassemzadeh | C09K 8/5045 | 507/124 |
| 2015/0022051 A1 * | 1/2015 | Meng | F04C 2/1075 | 310/216.001 |

* cited by examiner

Primary Examiner — Zakiya W Bates
Assistant Examiner — Crystal J Miller
(74) Attorney, Agent, or Firm — William Clyde Yarbrough

(57) ABSTRACT

The disclosed invention is a unique drilling fluid composition and method for reducing lost mud circulation in wellbores due to seepage loss into fluid permeable subterranean formations. The drilling fluid composition comprises a variety of shapes and sizes of distinctive unadulterated elastomeric rubber particles derived from the tire retreading (recapping) process. These elastomeric rubber particles are incorporated into an aqueous, hydrocarbon, or synthetic drilling fluid in sufficient amounts as to plug holes, fractures, and fissures, form a mud cake, and thus stem the loss of drilling fluids from the lost circulation zone.

11 Claims, No Drawings

LOST CIRCULATION DRILLING FLUIDS COMPRISING ELASTOMERIC RUBBER PARTICLES AND A METHOD FOR DECREASING WHOLE MUD LOSS USING SUCH COMPOSITION

BACKGROUND OF THE INVENTION

1. Field of the Invention

The present invention pertains to unique drilling fluids and a method for controlling seepage loss and lost circulation of drilling fluids into subterranean formation during drilling of boreholes in said formation. More particularly, the present invention relates to compositions and methods utilizing ground rubber elastomers derived from tire retreading (recapping) as a drilling fluid additive to reduce fluid loss into the formation.

2. Description of Related Art

Drilling fluids, also known as drilling "muds", are generally slurries of clay solids or polymers used in the drilling of wells in the earth for the purpose of recovering hydrocarbons, gas and other fluid materials. Drilling fluids have a number of functions when carrying out drilling operations in the subterranean formation such as: lubricating the drill string, removing formation cuttings from the well counterbalancing formation pressures to prevent the inflow of gas, oil or water from permeable rocks (encountered at various levels as drilling continues), holding the cuttings in suspension in the event of a shutdown in drilling and pumping of the drilling mud, and cooling and lubricating the bit and drilling assembly. In addition, the drilling fluid make-up should contain materials which serve to control loss of whole fluid when porous and depleted zones are being penetrated.

One principle purpose of a drilling fluid, though, is to deposit a thin layer on the wall of the well bore thus preventing fluid loss to the formation. This low permeability filter cake (mud cake) is formed when the drilling fluid containing particles proportionate in size to the openings in the formation being drilled seals these corresponding openings in the formation to reduce the unwanted loss of drilling fluids to permeable formations.

A large variety of materials have been used or proposed in attempts to cure lost circulation. Generally, such materials can be divided into four types or categories: fibrous materials, flaky materials, granular materials and slurries (such as the gunk-squeeze).

When whole fluid loss reaches an intolerable level, it is traditional to add various bulk materials known as LCMs (Lost Circulation Materials) to the drilling fluid in an attempt to decrease or reduce drilling fluid loss. Such prior art lost circulation materials are selected from different groups of materials in the form of flakes (or laminated), granular, and fibrous materials. Materials commonly used are cheap wastes from other industries such as cellulose fiber materials. These materials can include fibrous, flake, and/or granular ground forms, and combinations thereof. Representative of such cellulose fibers include nut and seed shells or hulls including: pecan, almond, walnut, peach, brazil, coconut, peanut, sunflower, flax, cocoa bean, cottonseed, rice, linseed, oat, and the like. See for example, Gockel, U.S. Pat. No. 4,498,995, Forrest, U.S. Pat. No. 5,706,592 and Mayeux, et al., U.S. Pat. No. 5,861,362.

Additionally, other LCMs have been utilized to reduce drilling fluid outflow and gas and fluid inflow info the bore hole such as oat hulls, ground corn cobs, hydrophobic organophilic wafer wettable cotton, ground citrus pulp, ground rice bulls and ground cotton burrs. See House, et al., U.S. Pat. No. 5,071,575 and Cowen, et al., U.S. Pat. No. 5,076,944.

Furthermore a varied group of particles has been discussed as possible drilling fluid additives consisting of resilient graphitic carbon particles, lignites, leonardites, lignin-based powders, bitumens, asphalts, clays cellulosic polymers, metal silicates, starches, guar gum, cellulosic fibers, fatty acids, welan gum, hydrocarbon resins, barite, hematite, chlorides, bromides, polyphosphates, zinc, gilsonite, graphite, graphitic carbon, coke and mixtures thereof. See Green, U.S. Pat. No. 6,825,152, Zaleski, et al., U.S. Pat. No. 5,826,689 and Whitfill, et al., U.S. Pat. No. 8,043,997, a group consisting of silicate, siliconate and mixtures thereof. See Whitfill, et al., U.S. Pat. No. 6,889,780, and hardenable composition slurry comprising of diatomaceous earth, a suspending agent, lime, loss control material sodium silicate, and sulfate has been described by Verret, U.S. Pat. No. &, 7,405,182.

Indeed Several different polymers and resins in combination with various particulate materials have been discussed by Verret, U.S. Pat. No. 7,297,862, Wood, U.S. Pat. No. 8,518,224, Chatterji, et al., U.S. Pat. No. 6,802,002, Shaarpour, U.S. Pat. No. 7,088,385, Reddy, et al., U.S. Pat. No. 7,284,611, Reddy, et al., U.S. Pat. No. 7,488,705, Ghassemzadeh, U.S. Pat. No. 7,923,713, Badalamenti, et al., U.S. Pat. No. 7,717,180 and U.S. Pat. No. 866,393 and Fang, et al., U.S. Pat. No. 7,870,903.

In addition to additives, several methods for reducing drilling fluid loss have been postulated including a process using the plugging of the porous formation by means of a polymeric solution containing pseudo-emulsion spheres by Peiffer, et al., U.S. Pat. No. 4,510,988, a method for reducing lost circulation of aqueous or oil based drilling fluids wherein one or more hydrocarbon absorbent polymers are dispersed in an aqueous carrier fluid which is then injected into the lost circulation zone by Delhommer, et al. U.S. Pat. Nos. 4,633,950 and 4,704,213, and sequential injections of spacers and varied particle and fiber containing fluids all in attempts to control mud loss due to permeable formations by Ghassemzadeh, U.S. Pat. No. 8,404,622.

Most closely related to the present invention are U.S. Pat. No. 6,806,232 issued to Cart and U.S. Pat. No. 6,518,224 issued to Wood. Cart discloses a ground elastomeric crumb rubber material which is derived from re-processed used tires which are subsequently ground, screened, and separated to insure desired elastomeric rubber particle sizes. Wood, as well describes two additional ways of manufacturing crumb rubber: (1) by cryogenically freezing whole tires or tire parts and subsequently shattering the rubber in a hammer mill to break down the tire into the desired particle sizes and removing steel and fibers and (2) physically tearing apart old tires and removing unwanted steel and fibers. As opposed to the present invention, though, the previous methods for procuring functionally useful crumb rubber elastomeric particles involve the additional steps of grinding, freezing and tearing while the present invention simply collects, sods, and classifies rubber that is utilized directly from tire retreading (recapping). The present invention utilizes these rubber particle shavings (1) without further physical manipulation and (2) absent any purification process to remove steel fibers. This is an advancement in that the current invention employs a simpler, streamlined process to acquire rubber particles that is ultimately easier and more cost effective.

While if is clear that a wide array of drilling fluid additives and methods for limiting and reducing lost circulation abound, there remains an unmet need to provide an economical and functional means to stem the loss of drilling fluid through lost circulation zones in subterranean formations. The primary goat of this invention is to meet those unfulfilled needs.

SUMMARY OF THE INVENTION

The drilling fluid kiss prevention system that is the present invention provides a unique drilling fluid additive comprising a combination of various sized and shaped elastomeric rubber sealant particles derived from the retreading (recapping) of used tires. These sealant particles are present in a range of forms including coarse, medium, and fine particles, and a blend of long and short fiber shapes designed for the treatment of drilling fluid in such amounts sufficient to inhibit drilling fluid loss into permeable subterranean formations during the drilling process. The composition of the present invention is effective when aqueous, oil, or synthetic based drilling fluids are used.

Lost circulation occurs when drilling fluid ("mud") moves from the wellbore into the adjacent formation through a network of cracks and fissures. When drilling fluid is lost to the surrounding formation, hydrostatic pressure is reduced and gas or fluid exhibiting a higher pressure moves into the wellbore thus establishing a lost circulation zone. Influx of gas and/or fluid in this lost circulation zone can create drilling fluid loss categorized as Minor and Major loss. "Minor losses" are categorized as a loss between 6 and 470 barrels a day and is controlled within 48 hours and "Major losses" are losses greater than 470 barrels a day or losses taking greater than 48 hours to control or stop. To counter the influx of gas or fluid a seal or "cake" must be established. To this end a drilling fluid additive must be introduced into the wellbore in an attempt to seal the lost circulation zone.

The composition of the present invention contains a combination of a variety of different elastomeric particle sizes and shapes generated in a distinctive rubber grinding process of tire retreading (recapping). Included in the different elastomer shapes are fibrous elastomers, flake elastomers and amorphous elastomeric pieces of the ground tires. Said particles have diameters ranging from 1 to 2,000 microns and length up to 4,000 microns.

These ground elastomers are added in quantities of about 1 to 100 pounds per forty two gallon (oilfield) barrel and constitute lost circulation material (LCM) that is utilized in the formation of the wellbore mud cake to stem the outflow of drilling fluid into fissures, cracks, and permeable formations.

The fluid loss prevention system of the present invention requires no additional additives other than those normally encountered in drilling fluid such as diesel, other synthetic oil and/or water. And while the elastomer particles are treated with a surface active agent allowing them to water-wet or oil-wet. depending on the composition of the drilling fluid to which they are being applied, the particles themselves are not further ground or purified after the tire retread (recapping) process has occurred. As described by Poling, Sr., et al. U.S. Pat. Nos. 7,381,114 and 8,231,428, the source of the fluid loss elastomeric particles of the present invention are simply collected and sorted after being ground to size and shape as a by-product of tire retreading (recapping). In opposition to the cryogenically derived and ground crumb rubber particles of prior additive procurement endeavors, the present invention describes a multitude of shaped and various sized particles created through a customary tire grinding retreading (recapping) process that is both less labor intensive and more cost effective than prior described inventions.

DESCRIPTION OF THE PREFERRED EMBODIMENTS

The present invention relates to limiting whole drilling fluid loss to the surrounding formation. More specifically, the present invention and method for use relate to the addition of unadulterated elastomeric rubber particles derived from tire retreading (recapping) into drilling fluid for the purpose of more effectively preventing fluid loss into porous zones of the wellbore. It is as well a goal of this invention to simplify the procurement of elastomeric rubber particles in a more cost-efficient manner.

The varied elastomeric rubber sealant particle components and the method for their inclusion into the drilling fluid that is the present invention is utilized in drilling operations to reduce lost circulation in a subterranean wellborn. Such areas of lost circulation are deemed "Lost Circulation Zones" and can be characterized by excessive loss of drilling fluid into cracks, fractures, and fissures in a porous subterranean formation. Additionally, loss of drilling fluid results in decreased hydrostatic pressure in the wellbore which allows formation fluids (e.g. natural gas and/or crude oil) to enter the wellbore and thus make their way to the surface in an unproductive and often dangerous manner. While minor fluid loss can result in lost time and dollars, major drilling fluid loss can have much costlier consequences due a sudden influx of formation fluids in the wellbore up to and including a "blowout" including work stoppage, equipment destruction, injury and possible loss of human life. It is the goal of the present invention to reduce, eliminate or wholly prevent these untoward consequences of entry of drilling fluid into these lost circulation zones.

The composition of the present invention is made up of combinations of a variety of different particle sizes and shapes of elastomeric rubber generated as a natural by-product of the retreading (recapping) process on worn tires. The unique properties of the rubber particles are such that the particles will swell when introduced to a hydrocarbon fluid and heat but at such a slow rate that little swelling occurs until the particles reach their desired location in the wellbore. Included in this mixture of multi-shaped swellable particles are fibrous particles, flake particles and amorphous pieces of the ground tires. Said particles have diameters of from 1 to 2,000 microns and length up to 4,000 microns. The combination of sizes and shapes work within the drilling fluid to form a patchwork of differing sized elastomeric particles in the wellbore lost circulation zone to form a filter cake for the prevention of whole fluid loss.

In the acquisition of rubber elastomeric particles, the elastomeric rubber particle shavings are first collected from the by-product of the tire retreading (recapping) process. The particles are then gathered without any further grinding. These raw particles are then screened and separated into discrete categories and are classified according to size and shape. The sizes range from 1 to 2000 microns in diameter and up to 4000 microns in length and 20 to 400 microns in diameter and up to 2000 microns in length.

The elastomeric rubber particles are then treated with a surfactant to make them either water or oil wettable (depending on the composition of the drilling fluid desired). The addition of the surfactant is crucial in that the elastomeric particles can be treated in such a manner as to allow them to conform to the existing drilling fluid. The treatment of the rubber particles may not be necessary when used in an oil or synthetic based drilling fluid.

In addition to the elastomeric rubber particles, a water-based drilling fluid will generally contain a suspension agent, such as a commercial clay or polymeric viscosifier, weight material (which may be insoluble—such as barite, galena, hematite or the like), fluid loss control agents, such as lignite, starch, carboxymethyl cellulose, carboxymethyl starch, polyacrylates and other polymers, and other additives such as viscosity control agents, lubricants, emulsifiers, lost circulation materials, oil and other functional additives.

Oil and synthetic oil base drilling fluids will generally contain additives, which provide the same or similar functions. Suspension agents are the organophilic clays. Representative weight materials are the insoluble materials similar to those used in water base drilling fluids. Representative fluid loss control agents are asphaltic materials, organophilic humates, organophilic lignosulfonates, various polymers and the like. Emulsifiers range from calcium soaps, such as calcium tallate, fatty amides, partial fatty amides of polyamines, and the like.

After surfactant treatment, if surfactant is deemed necessary, the elastomeric rubber particles are added to the desired drilling fluid in a sufficient amount to achieve affect in a range from about 1 pound to 80 pounds per 42 gallon oil field barrel. The treated drilling fluid is then injected into the drill string and down to the drill bit.

The following examples are given to further illustrate the invention.

EXAMPLE 1

The ground elastomeric sealant material was mixed into an 10.5 pound per gallon (ppg) lignosulfonate water based drilling fluid, in various amounts as listed in Table 1. In addition, the standard API RP 13B rheology was determined.

The ability of the drilling fluid to seal off a porous sand was then evaluated by the use of a Permeability Plugging Apparatus (PPA) at 250 degrees F. and a pressure differential of 500 psi. The filtering disc use has a pour size of 50 microns.

TABLE 1

Water Based Drilling Fluid Comparative Example 1

|  | A | B | C | D | E |  |
|---|---|---|---|---|---|---|
|  | 0 | 5 | 10 | 20 | 50 | ppb Sealant material |
| Plastic Viscosity, cp. | 13 | 14 | ND | ND | ND |  |
| Yield Pont, lb/100 sq ft | −2.5 | 5 | ND | ND | ND |  |
| Spurt Loss Value | 19 | 22 | 10 | 10.5 | 9 |  |
| Tota PPA Value | 57 | 31 | 22 | 23.5 | 13 |  |

*ND = not determined

EXAMPLE 2

The ground elastomeric sealant material was mixed into an 10.4 pound per gallon (ppg) diesel based drilling fluid, in various amounts as listed in Table 1. In addition, the standard API RP 13B rheology was determined.

The ability of the drilling fluid to seal off a porous sand was then evaluated by the use of a Permeability Plugging Apparatus (PPA) at 250 degrees F and a pressure differential of 500 psi. The filtering disc use has a pour size of 50 microns.

TABLE 2

Diesel Based Drilling Fluid Comparative Example 1

|  | A | B | C | D | E |  |
|---|---|---|---|---|---|---|
|  | 0 | 5 | 10 | 20 | 50 | ppb Sealant material |
| Plastic Viscosity, cp. | 10.5 | 14 | 15 | ND | ND |  |
| Yield Point, lb/100 sq ft | 0 | 10 | 1 | ND | ND |  |
| Spurt Loss Value | 210 BO | 190 | 170 | 85 | 17 |  |
| Total PPA Value | 244 BO | 230 | 100 | 125 | 33 |  |

*ND = not determined,
BO = Blow out

It should be understood, of course, that the foregoing relates to exemplary embodiments of the invention and that modifications may be made without departing from the spirit and scope of the invention as set forth in the following claims.

I claim:

1. A drilling fluid additive comprising elastometric rubber sealant material, wherein said material is a result of a process consisting essentially of
    shaving away rubber tire material from previously used tires;
    collecting raw bulk tire shavings absent further modification or purification but containing steel and fibers; and
    screening, sorting and categorizing the differing elastometric particle sizes and shapes from the shaving process, said particles having a diameter of from 1 to 2,000 microns and length up to 4,000 microns.

2. The drilling fluid additive of claim 1 wherein said elastometric rubber sealant material varies in diameter from 20 to 400 microns and length up to 2,000 microns.

3. The drilling fluid additive of claim 1 wherein said elastometric rubber sealant material has been treated with a surfactant rendering said rubber sealant material water wettable.

4. The drilling fluid additive of claim 1 wherein the amount of said elastometric rubber sealant material is incorporated into a drilling fluid from about 2 to about 50 pounds per 42 gallon oilfield barrel.

5. The drilling fluid additive of claim 1 wherein the amount of said elastometric rubber sealant material is incorporated into a drilling fluid from about 1 to about 80 pounds per 42 gallon oilfield barrel.

6. A drilling fluid additive comprising:
    elastomeric rubber sealant material that is a result of a process of shaving away rubber tire material from previously used tires
    collecting raw bulk tire shavings absent further physical manipulation or purification but containing steel and fibers;
    screening, sorting and categorizing the differing elastometric particle sizes and shapes from the shaving process, wherein a by-product of the retreading or recapping of rubber tires results in elastometric rubber sealant material resulting in various shapes and sizes selected from the group consisting of: fibrous particles, flake particles, granular particles, amorphous pieces, and combinations thereof which range in diameter from 1 to 2000 microns and a length up to 4000 microns.

7. The drilling fluid additive of claim 6 wherein said elastometric rubber sealant material is further defined as coarse, medium, and fine particles which are sifted from unadulterated raw bulk tire shavings from retreading and recapping and are subsequently divided according to shape and size.

8. The drilling fluid additive of claim 6 wherein the elastometric rubber sealant material is farther subdivided into long and short fiber shapes which are sifted from raw bulk tire shavings from the by-product of retreading and recapping and divided according to length.

9. The drilling fluid additive of claim 6 wherein the elastomeric rubber sealant material has been pretreated with a surfactant prior to additive addition to a water-based drilling fluid to make the elastometric sealant material water-wettable and allow said material to conform to a water-based drilling fluid before drilling fluid insertion into a well bore.

10. The drilling fluid additive of claim 9 wherein said surfactant is added contemporaneously to the water-based drilling fluid at the time of untreated sealant material addition and prior to introduction of drilling fluid into a well bore.

11. The drilling fluid additive of claim 6 wherein the elastometric rubber sealant material is added to a drilling fluid in quantities of about 1 to 100 pounds per forty two gallon barrel.

* * * * *